United States Patent
Jiang

(10) Patent No.: US 10,203,556 B2
(45) Date of Patent: Feb. 12, 2019

(54) DISPLAY SUBSTRATE HAVING PRE-TILT ANGLE FOR LIQUID CRYSTAL MOLECULES

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Xuebing Jiang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 0 days.

(21) Appl. No.: 15/537,184

(22) PCT Filed: Oct. 21, 2016

(86) PCT No.: PCT/CN2016/102955
§ 371 (c)(1),
(2) Date: Jun. 16, 2017

(87) PCT Pub. No.: WO2017/128779
PCT Pub. Date: Aug. 3, 2017

(65) Prior Publication Data
US 2018/0052368 A1    Feb. 22, 2018

(30) Foreign Application Priority Data
Jan. 26, 2016   (CN) .......................... 2016 1 0053267

(51) Int. Cl.
*G02F 1/13*      (2006.01)
*G02F 1/1337*    (2006.01)
(Continued)

(52) U.S. Cl.
CPC .... *G02F 1/133753* (2013.01); *G02F 1/13439* (2013.01); *G02F 1/133707* (2013.01);
(Continued)

(58) Field of Classification Search
CPC ......... G02F 1/133753; G02F 1/133707; G02F 1/133788; G02F 1/134309; G02F 1/13439; G02F 1/136286; G02F 2001/133757
See application file for complete search history.

(56) References Cited

U.S. PATENT DOCUMENTS 7,193,672 B2 * 3/2007 Takeda et al. ........ G02F 1/1337
                                                    349/129
7,227,608 B2 * 6/2007 Matsumoto ....... G02F 1/133371
                                                    349/129
(Continued)

FOREIGN PATENT DOCUMENTS

CN     101676784 A    3/2010
CN     103293767 A    9/2013
(Continued)

OTHER PUBLICATIONS

International Searc Report and Written Opinion dated Jan. 26, 2017; PCT/CN2016/102955.
(Continued)

*Primary Examiner* — Ida M Soward
(74) *Attorney, Agent, or Firm* — Ladas & Parry LLP

(57) ABSTRACT

A display substrate having pre-tilt angle for liquid crystal molecules and a manufacturing method thereof and a display device are provided. The display substrate includes a plurality of pixel regions, an alignment film for providing a pre-tilt angle for liquid crystal molecules being disposed in the plurality of pixel regions. In each of the pixel regions, a
(Continued)

surface of the alignment film has a plurality of orientation grooves extending along at least two directions.

20 Claims, 4 Drawing Sheets

(51) Int. Cl.
G02F 1/1343 (2006.01)
G02F 1/1362 (2006.01)
G02F 1/1368 (2006.01)

(52) U.S. Cl.
CPC .. *G02F 1/133788* (2013.01); *G02F 1/134309* (2013.01); *G02F 1/136286* (2013.01); *G02F 1/1368* (2013.01); *G02F 1/133784* (2013.01); *G02F 2001/133757* (2013.01); *G02F 2001/133761* (2013.01); *G02F 2001/133776* (2013.01); *G02F 2001/134372* (2013.01); *G02F 2001/136295* (2013.01); *G02F 2201/123* (2013.01); *G02F 2203/01* (2013.01)

(56) References Cited

U.S. PATENT DOCUMENTS

| | | | |
|---|---|---|---|
| 7,355,664 B2 * | 4/2008 | Ogishima | G02F 1/133512 349/110 |
| 8,537,316 B2 * | 9/2013 | Koma et al. | G01F 1/1337 349/129 |
| 9,366,904 B2 * | 6/2016 | Li | G02F 1/1337 349/139 |
| 9,658,493 B2 * | 5/2017 | Oh et al. | G02F 1/133707 349/129 |
| 2001/0006410 A1 * | 7/2001 | Yamada et al. | G02F 1/335 349/178 |
| 2001/0043305 A1 * | 11/2001 | Ohmuro | G02F 1/133707 349/143 |
| 2002/0033922 A1 * | 3/2002 | Hidehira | G02F 1/134363 349/141 |
| 2005/0237463 A1 * | 10/2005 | Kubo | G02F 1/1343 349/139 |
| 2005/0243256 A1 * | 11/2005 | Yang et al. | G02F 1/1343 349/141 |
| 2005/0264720 A1 | 12/2005 | Itou et al. | |
| 2007/0139596 A1 * | 6/2007 | Kim | G02F 1/1303 349/129 |
| 2009/0231531 A1 * | 9/2009 | Yoo et al. | G02F 1/1343 349/143 |
| 2010/0034989 A1 | 2/2010 | Choi et al. | |
| 2012/0194766 A1 * | 8/2012 | Kaihoko | G02F 1/133634 349/96 |
| 2012/0200795 A1 * | 8/2012 | Takatori | G02B 27/2214 349/33 |
| 2014/0360860 A1 * | 12/2014 | Miyachi et al. | C08F 22/10 204/157.69 |
| 2015/0055063 A1 | 2/2015 | Hsieh | |
| 2015/0205148 A1 * | 7/2015 | Asakwa | G02F 1/133707 349/43 |
| 2015/0286105 A1 * | 10/2015 | Sugimoto et al. | G02F 1/134363 349/139 |
| 2015/0316821 A1 * | 11/2015 | Lee | G02F 1/133707 349/33 |
| 2016/0011472 A1 * | 1/2016 | Sasaki | G02F 1/1343 349/129 |
| 2016/0238887 A1 * | 8/2016 | Yao et al. | G02F 1/1335 349/178 |
| 2016/0238889 A1 | 8/2016 | Zhang et al. | |
| 2016/0238898 A1 * | 8/2016 | Yao et al. | G02F 1/133753 349/141 |
| 2017/0160598 A1 * | 6/2017 | Tang | G02F 1/133345 |
| 2018/0011379 A1 * | 1/2018 | Woo | G02F 1/134336 |

FOREIGN PATENT DOCUMENTS

| | | | | |
|---|---|---|---|---|
| CN | 104423096 A | | 3/2015 | |
| CN | 104503149 A | * | 4/2015 | ....... G02F 1/133753 |
| CN | 104597665 A | | 5/2015 | |
| CN | 105487299 A | | 4/2016 | |
| EP | 2083316 A3 | * | 11/2010 | ....... G02F 1/133753 |
| WO | WO2012115032 A1 | * | 8/2012 | ....... G02F 1/133753 |
| WO | WO2013100088 A1 | * | 7/2013 | ....... G02F 1/133753 |

OTHER PUBLICATIONS

The First Chinese Office Action dated Apr. 21, 2017; Appln. No. 201610053267.6.

* cited by examiner

DISPLAY SUBSTRATE HAVING PRE-TILT ANGLE FOR LIQUID CRYSTAL MOLECULES

TECHNICAL FIELD

Embodiments of the present disclosure relate to a display substrate and a manufacturing method thereof and a display device.

BACKGROUND

With development of a manufacturing technology, a Thin Film Transistor Liquid Crystal Display (TFT-LCD) has replaced a traditional CRT display to become a mainstream of the display because of advantages of low power consumption, low manufacturing cost, no radiation, etc. A display panel of the TFT-LCD is formed by cell-assembling a TFT array substrate and an opposed substrate, and liquid crystal molecules are filled between the array substrate and the opposed substrate.

Compared with other display modes, an FFS mode has the advantages of wide visual angle and high transmittance rate and has been widely applied to high-end displays.

SUMMARY

An embodiment of the present disclosure provides a display substrate, comprising a plurality of pixel regions, an alignment film for providing a pre-tilt angle for liquid crystal molecules is disposed in the plurality of pixel regions, and in each of the pixel regions, a surface of the alignment film has a plurality of orientation grooves extending along at least two directions.

For example, the display substrate is an array substrate, and the display substrate further comprises a pixel electrode located in each of the pixel regions, and the pixel electrode has a plurality of slits, and each slit extends along a same direction.

For example, the display substrate further comprises a plurality of gate lines and a plurality of data lines intersecting with each other and configured define the plurality of pixel regions, and each data line extends along a same direction.

For example, in each of the pixel regions, the orientation grooves on the surface of the alignment film are in a folded-line shape.

For example, in each of the pixel regions, the alignment film includes a first region and a second region, the orientation grooves include a plurality of first orientation grooves located in the first region and a plurality of second orientation grooves located in the second region, and the first orientation grooves extend along a first direction and the second orientation grooves extend along a second direction.

For example, the display substrate is an opposed substrate.

For example, the alignment film is a photo-alignment film.

An embodiment of the present disclosure provides a display device, comprising any one of the above-described display substrate.

An embodiment of the present disclosure provides a manufacturing method for a display substrate, the display substrate comprising a plurality of pixel regions, the manufacturing method comprising an operation of forming an alignment film for providing a pre-tilt angle for liquid crystal molecules in the plurality of pixel regions, wherein forming of the alignment film includes: forming a plurality of orientation grooves extending along at least two directions on the surface of the alignment film of each of the pixel regions.

For example, the display substrate is an array substrate, and the manufacturing method further comprises: forming a pixel electrode in each of the pixel regions, and forming a plurality of slits in the pixel electrode, each slit extending along a same direction.

For example, the manufacturing method further comprises: forming a plurality of gate lines and a plurality of data lines intersecting with each other and configured define the pixel regions, each data line extending along a same direction.

For example, the alignment film is a photo-alignment film, and the alignment film in each of the pixel regions includes a first region and a second region; forming of the plurality of orientation grooves extending along at least two directions on the surface of the alignment film of each of the pixel regions includes: performing exposure and development on the first region by first linearly polarized light whose polarization direction is a first direction through a first mask pattern to form first orientation grooves in the first region, the first mask pattern having light transmitting strips extending along the first direction; and performing exposure and development on the second region by second linearly polarized light whose polarization direction is a second direction through a second mask pattern to form second orientation grooves in the second region, the second mask pattern having light transmitting strips extending along the second direction.

For example, the alignment film is a photo-alignment film, and the alignment film in each of the pixel regions includes a first region and a second region; forming of the plurality of orientation grooves extending along at least two directions on the surface of the alignment film of each of the pixel regions includes: performing exposure on the first region by first incident light with a first wavelength through a first mask pattern to form first orientation grooves in the first region, the first mask pattern having light transmitting strips extending along a first direction; and performing exposure on the second region by second incident light with a second wavelength through a second mask pattern to form second orientation grooves in the second region, the second mask pattern having light transmitting strips extending along a second direction.

For example, the first mask pattern and the second mask pattern share a same base substrate; shielding the second mask pattern upon the first region being exposed; and shielding the second mask pattern upon the second region being exposed.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure. For those skilled in the related art, other drawings can be obtained according to these drawings without creative work.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In the liquid crystal display technology, alignment films are respectively formed on inner side surfaces of an array substrate and an opposed substrate which are required to be subjected to cell-assembling, and the alignment films are used to provide a pre-tilt angle for liquid crystal molecules, such that the liquid crystal molecules are arranged according to a certain rule.

Figure 1:
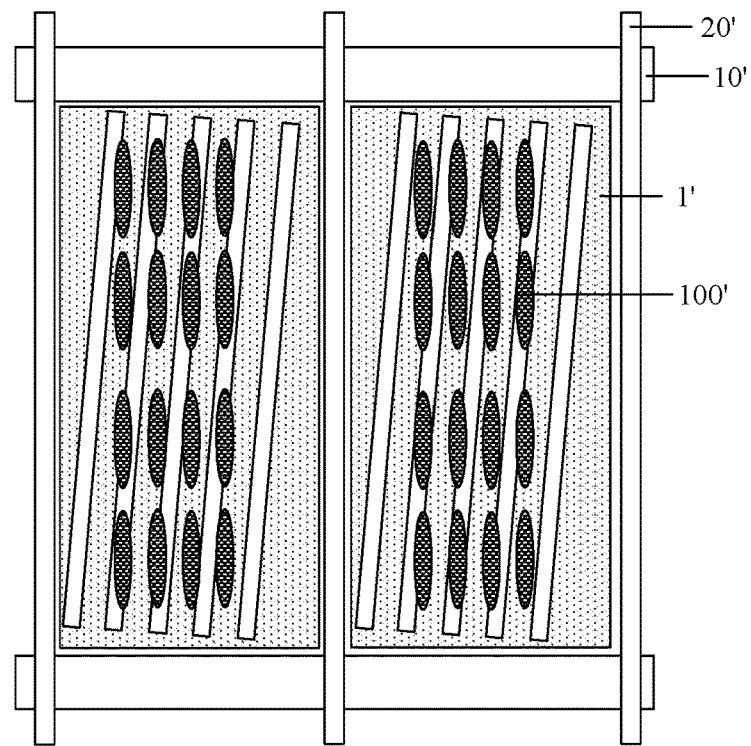
FIG. 1 is a structural schematic diagram of an array substrate of a single domain display mode in state of art.
Figure 2:
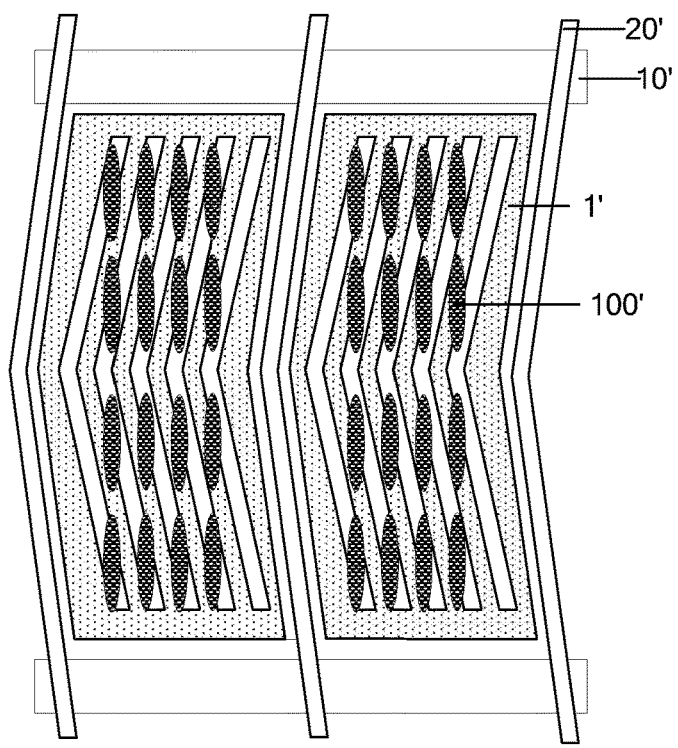
FIG. 2 is a structural schematic diagram of an array substrate of a dual domain display mode in state of art.

As shown in FIG. 1 and FIG. 2, the array substrate includes gate lines 10' and data lines 20' intersecting transversely and longitudinally, the gate lines 10' and the data lines 20' define a plurality of pixel units, an alignment film (not shown) is formed on the plurality of pixel units and is used to provide a certain pre-tilt angle for the liquid crystal molecules. Each pixel unit comprises a Thin Film Transistor (TFT) (not shown) and a pixel electrode 1'. The TFT as a switch device controls a drive electric field to be generated between the pixel electrode 1' and a common electrode, such that torsion of the liquid crystal molecules is controlled, and picture display is realized. In the FFS mode, as shown in FIG., in a traditional single domain structure, each slit in the pixel electrode 1' extends along the same direction and a single domain drive electric field is formed. Because of the plane torsion of the liquid crystal molecules, a severe phenomenon of left and right color cast of a plane is caused. In order to improve the color cast problem of the traditional single domain display mode, as shown in FIG. 2, a dual domain structure is adopted in some products at present, each slit in the pixel electrode 1' extends along two direction to present a folded-line shape. Compared with the single domain structure, the dual domain structure has a dual domain drive electric field, which is favorable for color cast compensation. In order to ensure a high aperture ratio, in the current dual domain structure, the data line 20' is bent in a pixel region, and thus, a total length of the data line 20' is increased, and transmission resistance is increased. In order to ensure charging efficiency of the pixel unit, the data line 20' needs to be widened or thickened, but related defects of decreased aperture ratio and poor friction of the alignment film are caused.

The display substrate provided by an embodiment of the present disclosure is the array substrate or opposed substrate including an alignment film; by being disposed in each of the pixel regions, a surface of the alignment film has a plurality of orientation grooves extending along at least two directions, to provide pre-tilt angles in different directions for the liquid crystal molecules, so that a multi-domain display mode is realized, which is favorable for color cast compensation and improves a display quality. The alignment film is made of a transparent material and located in the whole display region, and therefore, the multi-domain display structure of the embodiment of the present disclosure will not affect an aperture ratio of pixels and will not generate an influence on other structures of the display substrate either.

The embodiments of the present disclosure will be further described in detail in combination with drawings. The embodiments below are intended for explaining the present disclosure rather than limiting a scope of the present disclosure.

The display substrate which is a thin film transistor array substrate is taken as an example to specifically introduce technical solutions of the embodiments of the present disclosure.

It needs to be noted that the technical solution of the embodiment of the present disclosure is not only applicable to a thin film transistor array substrate but also applicable to other display substrates having an alignment film thereon, such as the opposed substrate, and other types of array substrates and package substrates.

Figure 3:
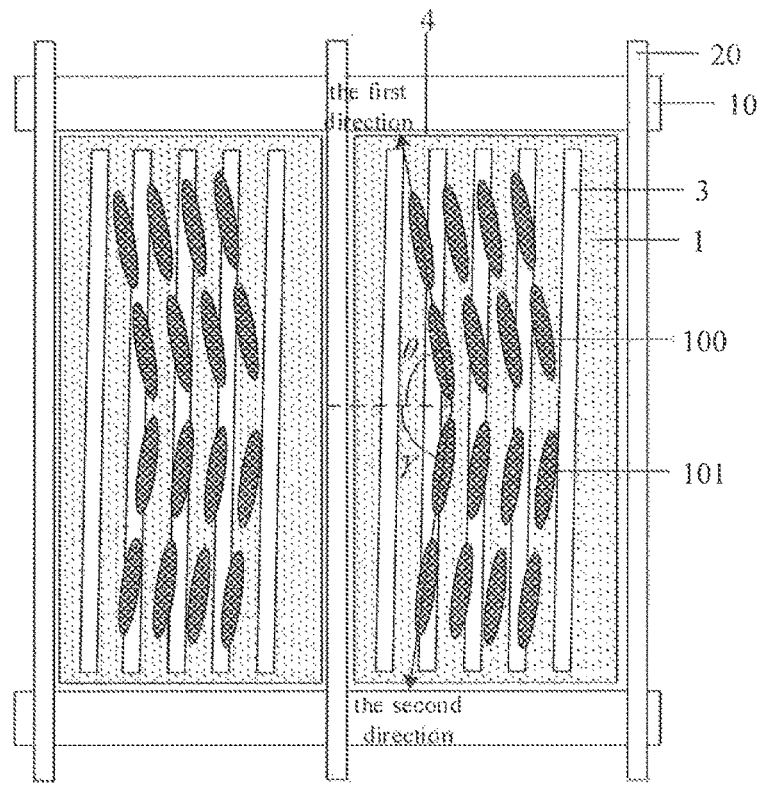
FIG. 3 is a structural schematic diagram of an array substrate of a dual domain display mode when an alignment film is not schematic in an embodiment of the present disclosure.
Figure 4:
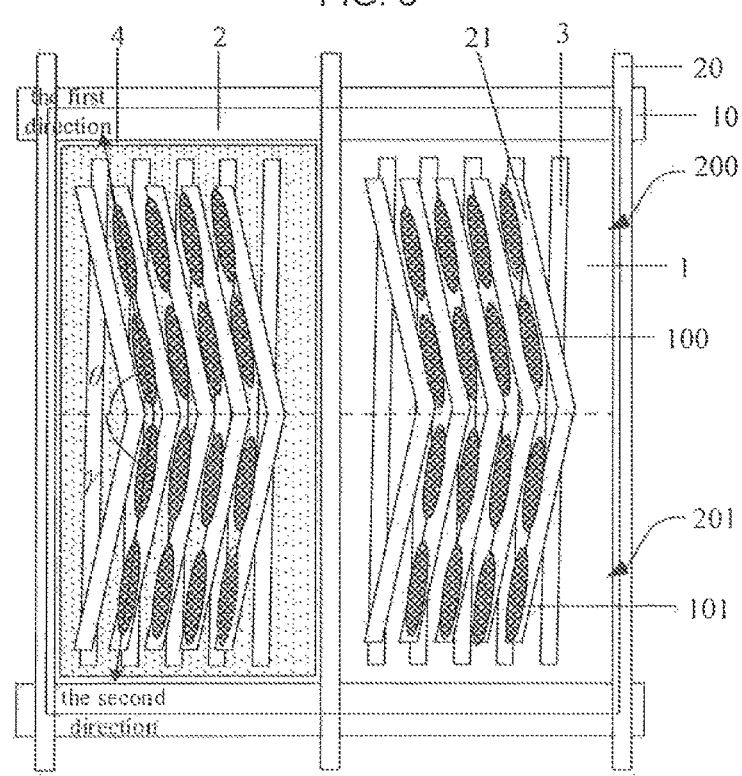
FIG. 4 is a structural schematic diagram of an array substrate of a dual domain display mode when an alignment film is schematic in an embodiment of the present disclosure.
Figure 5:
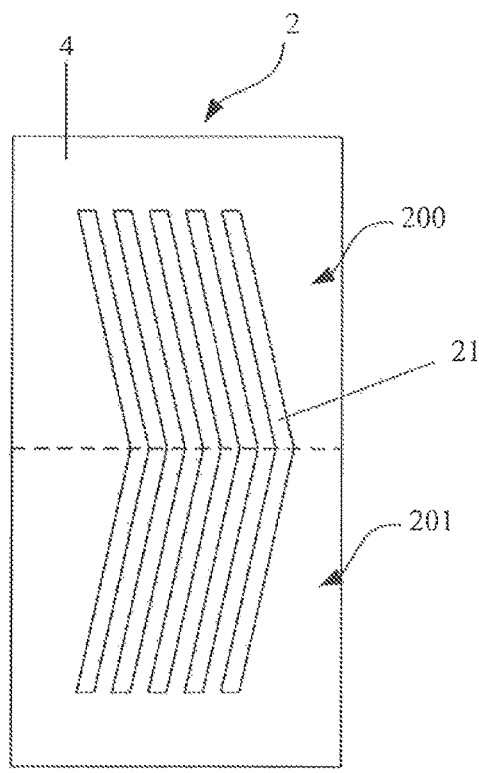
FIG. 5 is a structural schematic diagram of an alignment film in each of the pixel regions.

As shown FIGS. 3-5, the thin film transistor array substrate in an embodiment of the present disclosure includes gate lines 10 and data lines 20, for defining a plurality of pixel regions 4. Each of the pixel regions 4 includes a thin film transistor (not shown) and a pixel electrode 1, a gate electrode of the thin film transistor is electrically connected or integrally formed with the gate line 10, a source electrode is electrically connected or integrally formed with the data line 20, and a drain electrode is electrically connected to the pixel electrode 1. The thin film transistor as a switch device controls transmission of a data signal to the pixel electrode 1, such that an electric field driving the liquid crystal molecules to deflect is formed between the pixel electrode 1 and a common electrode (not shown), so as to realize display.

The array substrate further includes an alignment film 2, for providing a pre-tilt angle $\theta/\gamma$ for the liquid crystal molecules, such that the liquid crystal molecules are arranged according to a certain rule. In each of the pixel regions 4, the surface of the alignment film 2 has a plurality of orientation grooves 21 extending along at least two directions, such that the liquid crystal molecules corresponding to each of the pixel regions 4 have the pre-tilt angles $\theta/\gamma$ of at least two directions, for example, first liquid crystal molecules 100 and second liquid crystal molecules 101 in FIG. 3 have the pre-tilt angles $\theta/\gamma$ (the first liquid crystal molecules 100 have the pre-tilt angles $\theta$, and the second liquid crystal molecules 101 have the pre-tilt angles $\gamma$) of different angles, such that a multi-domain display mode is realized, which is favorable for color cast compensation and improves a display quality. The alignment film 2 is made of a transparent material and located in a whole display region, and therefore, the multi-domain display structure above will not affect an aperture ratio of pixels and will not generate an influence on other structures of the display substrate either.

In an embodiment of the present disclosure, the multi-domain display mode is realized by the alignment film 2, then when the pixel electrode 1 has a plurality of slits 3, each slit 3 can be disposed to extend along a same direction. Further, because each slit 3 in the pixel electrode 1 extends along the same direction, then while the aperture ratio of pixels is ensured, each data line 20 can be disposed to extend along the same direction; different from the multi-domain display structure which needs to bend the data line 20 in the state of art, the straight data line 20 has the shortest length and smallest transmission resistance, which ensures charging efficiency of the pixels. Besides, the width of the data line 20 is smaller, and an aperture ratio of the pixels will not be affected.

For example, the orientation grooves 21 in the alignment film 2 can be formed by a friction process, a photo-alignment process or other orientation processes, which is not limited herein. When the orientation grooves 21 are formed through the photo-alignment process, the alignment film 2 is the photo-alignment film, for example, a polyimide film.

For example, in a certain direction, each of the pixel regions 4 is divided into a plurality of sub-pixel regions. In each sub-pixel region, each orientation groove 21 on the surface of the alignment film 2 extends along the same direction, all orientation grooves 21 have the same extending direction, so as to simplify the structure of the alignment film 2 and an alignment process thereof, and the liquid crystal molecules can also be arranged regularly. The certain direction can be parallel to the extending direction of the gate line 10, and can also be parallel to the extending direction of the data line 20, or any other directions. For example, in the embodiment of the present disclosure, the certain direction is disposed to be parallel to the extending direction of the data line 20. By taking the dual domain mode as an example, each of the pixel regions 4 is segmented into a first sub-pixel region and a second sub-pixel region, each orientation groove 21 on the surface of the alignment film 2 located in the first sub-pixel region extends along a first direction, and the extending directions of all orientation grooves 21 are the same; and each orientation groove 21 on the surface of the alignment film 2 located in the second sub-pixel region extends along a second direction, and the extending directions of all orientation grooves 21 are same. That is, in each of the pixel regions 4, the alignment film 2 includes a first region 200 corresponding to the first sub-pixel region in position and a second region 201 corresponding to the second sub-pixel region in position, the orientation grooves 21 include a plurality of first orientation grooves located in the first region 200 and a plurality of second grooves located in the second region 201, each first orientation groove extends along the first direction, and each second orientation groove extends along the second direction. The first direction is not parallel to the second direction.

In each of the pixel regions 4, the surface of the alignment film 2 has a plurality of orientation grooves 21 extending along at least two directions; in order to ensure that all liquid crystal molecules in each of the pixel regions 4 have a pre-tilt angle θ/γ and improve a display quality, it is required to dispose the orientation grooves 21 of the alignment film 2 to cover the whole pixel region as much as possible. In order to realize the objective above, in combination with FIGS. 4 and 5, according to an embodiment of the present disclosure, in each of the pixel regions 4, the orientation groove 21 on the surface of the alignment film 2 is in a folded-line shape, such that the liquid crystal molecules having the pre-tilt angles θ/γ of different directions are continuously arranged. For example, the orientation grooves 21 can be a straight folded-line shape or curved folded-line shape. The orientation grooves 21 can be regularly distributed in the pixel region or can also be irregularly arranged in the pixel region.

In an embodiment of the present disclosure, the orientation grooves 21 on the surface of the alignment film 2 in each of the pixel regions 4 are set to be a straight folded-line shape, and the shape is simple and convenient to realize. Further, or in a certain direction, each of the pixel regions 4 is segmented into a plurality of sub-pixel regions; in each sub-pixel region, each orientation groove 21 on the surface of the alignment film 2 extends along the same direction, all the orientation grooves 21 have the same extending direction, then as shown in FIG. 5, in each of the pixel regions 4, the surface of the alignment film 2 has a plurality of straight-folded-line-shaped orientation grooves 21 disposed in parallel, all the orientation grooves 21 extend along the certain direction, the structure and the orientation process of the alignment film 2 are simplified, and all liquid crystal molecules in the pixel region have pre-tilt angles θ/γ. The certain direction can be parallel to the extending direction of the gate line 10, and can also be parallel to the extending direction of the data line 20, or any other directions. For example, in an embodiment of the present disclosure, the certain direction is set to be parallel to the extending direction of the data line 20.

As shown in FIG. 4, the thin film transistor array substrate in the embodiment of the present disclosure includes: gate lines 10 and data lines 20 intersecting with each other, and defining a plurality of pixel regions 4; an alignment film 2 covering all pixel regions 4, wherein, in each of the pixel regions 4, the surface of the alignment film 2 in each of the pixel regions 4 has a plurality of straight folded line orientation grooves 21 in parallel, and all orientation grooves 21 extend along the extending direction of the data line 20.

Each of the pixel regions 4 includes a thin film transistor (not shown) and a pixel electrode 1, the pixel electrode 1 has a plurality of slits 3, and each slit 3 extends along the same direction. A gate electrode of the thin film transistor is electrically connected or integrally formed with the gate line 10, a source electrode is electrically connected or integrally formed with the data line 20 and a drain electrode is electrically connected to the pixel electrode 1.

An embodiment of the present disclosure further provides a manufacturing method for a thin film transistor array substrate, the manufacturing method comprises: forming gate lines and data lines intersecting with each other, for defining a plurality of pixel regions; forming a thin film transistor and a pixel electrode formed in each of the pixel regions; forming an alignment film providing a pre-tilt angle for liquid crystal molecules.

For example, the operation of forming the alignment film includes: forming a plurality of orientation grooves extending along at least two directions on the surface of the alignment film of each of the pixel regions.

The surface, corresponding to each of the pixel regions, of the alignment film formed by the operation above has a plurality of orientation grooves extending along at least two directions, which provide the pre-tilt angles of different directions for the liquid crystal molecules, such that the multi-domain display mode is realized, color cast compensation is facilitated and a display quality is improved. The alignment film is made of a transparent material and located in the whole display region, and therefore, the multi-domain display structure above will not affect an aperture ratio of pixels and will not generate an influence on other structures of the display substrate either.

In an embodiment of the present disclosure, the multi-domain display mode is realized by the alignment film 2, then the operation of forming the pixel electrode includes:

forming the pixel electrode in the pixel region, and forming a plurality of slits in the pixel electrode, each slit extending along the same direction.

Further, because the slits in the pixel electrode extend along the same direction, then while the aperture ratio of the pixels is ensured, the data lines can be disposed to extend along the same direction; different from the multi-domain display structure which needs to bend the data line 20 in the state of art, the straight data line 20 has the shortest length and smallest transmission resistance, which ensures charging efficiency of the pixels. Besides, the width of the data line 20 is smaller, and an aperture ratio of the pixels will not be affected.

For example, for the alignment film in the embodiment of the present disclosure, the process for forming the orientation grooves on the surface of the alignment film is as follows.

As shown in FIG. 5, in each of the pixel regions 4, the alignment film 2 includes a first region 200 and a second region 201, the orientation grooves 21 include a plurality of first orientation grooves located in the first region 200 and a plurality of second grooves located in the second region 201, the first orientation grooves extend along the first direction, the second orientation grooves extend along the second direction, and the first orientation grooves extend along the first direction, the second orientation grooves extend along the second direction, and the first orientation grooves and the second orientation grooves are respectively formed by two photo-alignment processes.

In one specific embodiment, for example, the operation of forming a plurality of orientation grooves 21 extending along at least two directions on the surface of the alignment film 2 of each of the pixel regions 4 includes the following operations.

Figure 6:
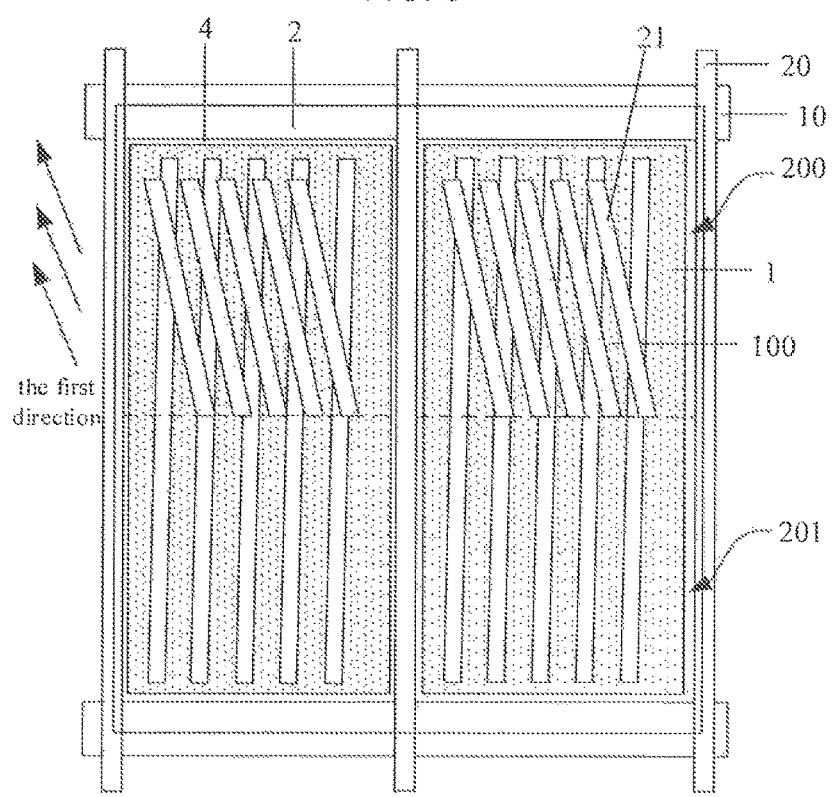
FIG. 6 and FIG. 7 are schematic diagrams of a manufacturing process for an alignment film in an embodiment of the present disclosure.
Figure 7:
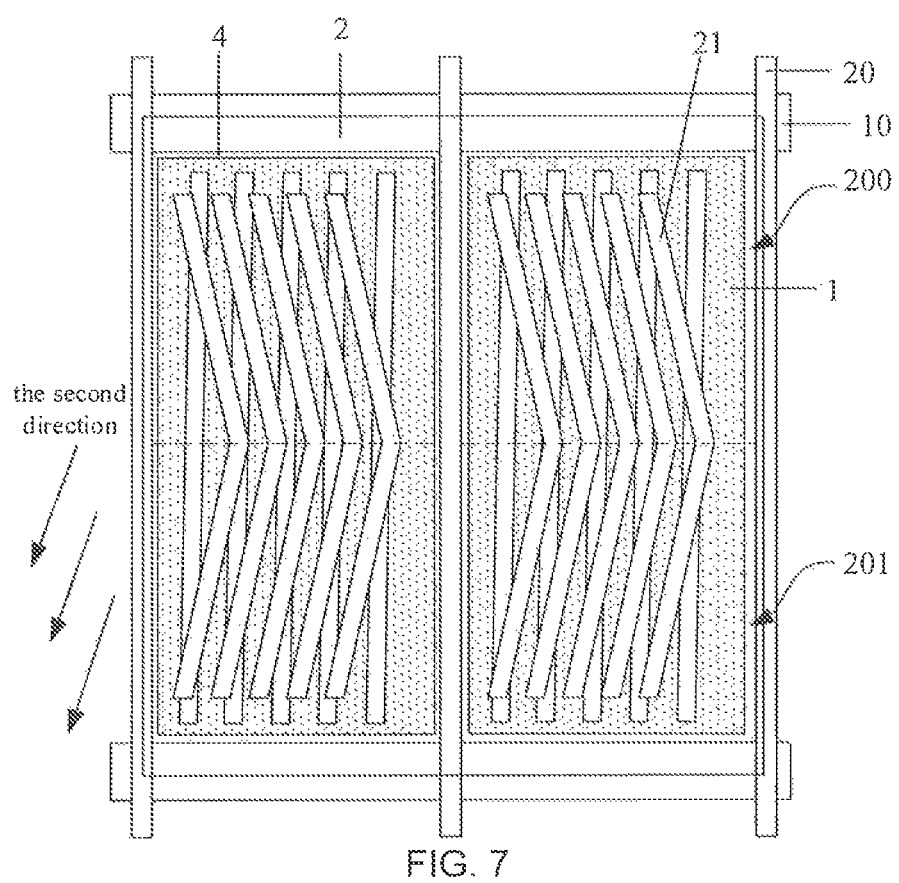

As shown in FIG. 6, performing exposure and development on the first region 200 by first linearly polarized light whose polarization direction is a first direction through a first mask pattern to form first orientation grooves in the first region 200, the first mask pattern having light transmitting strips extending along the first direction; and as shown in FIG. 7, performing exposure and development on the second region by second linearly polarized light whose polarization direction is a second direction through a second mask pattern to form second orientation grooves in the second region, the second mask pattern having light transmitting strips extending along the second direction.

In another specific embodiment, the operation of forming a plurality of orientation grooves extending along at least two directions on the surface of the alignment film of each of the pixel regions 4 includes the following operations.

As shown in FIG. 6, performing exposure on the first region 200 by first incident light with a first wavelength through a first mask pattern to form first orientation grooves in the first region 200, the first mask pattern having light transmitting strips extending along a first direction; and as shown in FIG. 7, performing exposure on the second region 201 by second incident light with a second wavelength through a second mask pattern to form second orientation grooves in the second region 201, the second mask pattern having light transmitting strips extending along a second direction.

In the first specific embodiment above, the first orientation grooves of the first region 200 and the second orientation grooves of the second region 201 are respectively formed by selecting the linearly polarized light of different polarization directions. In the second specific embodiment above, the first orientation grooves of the first region 200 and the second orientation grooves of the second region 201 are respectively formed by selecting the light rays of different wavelengths.

For example, the first mask pattern and the second mask pattern share the same substrate. That is, the first mask pattern and the second mask pattern are manufactured on the same substrate, and thus in an actual technological process, exposure on the first region 200 and the second region 201 only needs to be subjected to once alignment, time is shortened, and cost is reduced. When the first region 200 is exposed, the light rays are stopped from transmitting through the second mask pattern in a manner of selecting transmitting light rays, so as to achieve an objective of shielding the second mask pattern; when the second region 201 is exposed, the light rays are stopped from transmitting through the first mask pattern through a manner of selecting transmitting light rays, so as to achieve an objective of shielding the first mask pattern. The substrate is of a transparent substrate, for example, a glass substrate, a quartz substrate, an organic resin substrate or the like.

It needs to be noted that the manufacturing method in the two specific embodiments above is suitable for manufacturing the orientation grooves having two or more different extending directions on the surface of the alignment film.

An embodiment of the present disclosure further provides a display device, comprising the above-described array substrate, which can ensure an aperture ratio and a charging ratio of pixels while the multi-domain display mode is realized.

For example, the display device can be any product or part having a display function, such as a display panel, electronic paper, a mobile phone, a tablet computer, a television, a display, a laptop, a digital photo frame and a navigator.

The display device further comprises an opposed substrate, the opposed substrate also includes an alignment film, the orientation grooves can be formed in the alignment film of the opposed substrate by adopting the manufacturing method in the embodiment of the present disclosure, and in each of the pixel regions 4, the surface of the alignment film of the opposed substrate has a plurality of orientation grooves extending along at least two directions. Other structures of the opposed substrate, for example a black matrix, a passivation layer, etc., can be formed by adopting a manufacturing process in the state of art, and are not repeated herein.

It can be understood that an orientation direction of the alignment film on the opposed substrate is matched with that of the alignment film on the array substrate. When the alignment film is a photo-alignment film, the same mask can be adopted to perform alignment on corresponding regions of the opposed substrate and the array substrate, so as to reduce a production cost and shorten process time.

The foregoing embodiments merely are exemplary embodiments of the disclosure, and not intended to define the scope of the disclosure, and the scope of the disclosure is determined by the appended claims.

The application claims the priority of Chinese Patent Application No. 201610053267.6 filed on Jan. 26, 2016, the disclosure of which is incorporated herein by reference in its entirety as part of the present application.

What is claimed is:

1. A display substrate, comprising a plurality of pixel regions, an alignment film for providing a pre-tilt angle for liquid crystal molecules being disposed in the plurality of pixel regions, wherein in each of the pixel regions, a surface of the alignment film has a plurality of orientation grooves extending along at least two directions.

2. The display substrate according to claim 1, wherein the display substrate is an array substrate, and
the display substrate further comprises a pixel electrode located in each of the pixel regions, and the pixel electrode has a plurality of slits, and each slit extends along a same direction.

3. The display substrate according to claim 2, wherein the display substrate further comprises a plurality of gate lines and a plurality of data lines intersecting with each other and configured define the plurality of pixel regions, and each data line extends along a same direction.

4. The display substrate according to claim 3, wherein in each of the pixel regions, the orientation grooves on the surface of the alignment film are in a folded-line shape.

5. The display substrate according to claim 4, wherein in each of the pixel regions, the alignment film comprises a first region and a second region, the orientation grooves comprise a plurality of first orientation grooves located in the first region and a plurality of second orientation grooves located in the second region, and the first orientation grooves extend along a first direction and the second orientation grooves extend along a second direction.

6. The display substrate according to cairn 2, wherein in each of the pixel regions, the orientation grooves on the surface of the alignment film are in a folded-line shape.

7. The display substrate according to claim 6, wherein in each of the pixel regions, the alignment film comprises a first region and a second region, the orientation grooves comprise a plurality of first orientation grooves located in the first region and a plurality of second orientation grooves located in the second region, and the first orientation grooves extend along a first direction and the second orientation grooves extend along a second direction.

8. The display substrate according to claim 2, wherein the alignment film is a photo-alignment film.

9. The display substrate according to claim 1, wherein in each of the pixel regions, the orientation grooves on the surface of the alignment film are in a folded-line shape.

10. The display substrate according to claim 9, wherein in each of the pixel regions, the alignment film comprises a first region and a second region, the orientation grooves comprise a plurality of first orientation grooves located in the first region and a plurality of second orientation grooves located in the second region, and the first orientation grooves extend along a first direction and the second orientation grooves extend along a second direction.

11. The display substrate according to claim 1, wherein the display substrate is an opposed substrate.

12. The display substrate according to claim 1, wherein the alignment film is a photo-alignment film.

13. A display device, comprising the display substrate according to claim 1.

14. A manufacturing method for a display substrate, the display substrate comprising a plurality of pixel regions, the manufacturing method comprising an operation of forming an alignment film for providing a pre-tilt angle for liquid crystal molecules in the plurality of pixel regions, wherein forming of the alignment film comprises:
forming a plurality of orientation grooves extending along at least two directions on the surface of the alignment film of each of the pixel regions.

15. The manufacturing method according to claim 14, wherein the display substrate is an array substrate, and the manufacturing method further comprises:
forming a pixel electrode in each of the pixel regions, and forming a plurality of slits in the pixel electrode, each slit extending along a same direction.

16. The manufacturing method according to claim 15, wherein the manufacturing method further comprises:
forming a plurality of gate lines and a plurality of data lines intersecting with each other and configured define the pixel regions, each data line extending along a same direction.

17. The manufacturing method according to claim 14, wherein the alignment film is a photo-alignment film, and the alignment film in each of the pixel regions comprises a first region and a second region;
forming of the plurality of orientation grooves extending along at least two directions on the surface of the alignment film of each of the pixel regions comprises:
performing exposure and development on the first region by first linearly polarized light whose polarization direction is a first direction through a first mask pattern to form first orientation grooves in the first region, the first mask pattern having light transmitting strips extending along the first direction; and
performing exposure and development on the second region by second linearly polarized light whose polarization direction is a second direction through a second mask pattern to form second orientation grooves in the second region, the second mask pattern having light transmitting strips extending along the second direction.

18. The manufacturing method according to claim 17, wherein the first mask pattern and the second mask pattern share a same base substrate;
shielding the second mask pattern upon the first region being exposed; and
shielding the second mask pattern upon the second region being exposed.

19. The manufacturing method according to claim 14, wherein the alignment film is a photo-alignment film, and the alignment film in each of the pixel regions comprises a first region and a second region;
forming of the plurality of orientation grooves extending along at least two directions on the surface of the alignment film of each of the pixel regions comprises:
performing exposure on the first region by first incident light with a first wavelength through a first mask pattern to form first orientation grooves in the first region, the first mask pattern having light transmitting strips extending along a first direction; and
performing exposure on the second region by second incident light with a second wavelength through a second mask pattern to form second orientation grooves in the second region, the second mask pattern having light transmitting strips extending along a second direction.

20. The manufacturing method according to claim 19, wherein the first mask pattern and the second mask pattern share a same base substrate;
shielding the second mask pattern upon the first region being exposed; and
shielding the second mask pattern upon the second region being exposed.

* * * * *